May 15, 1962

R. L. SPEAKER 3,034,665

CONVEYOR SYSTEM

Filed May 22, 1958

INVENTOR.
RICHARD L. SPEAKER
BY
Andrus + Starke
Attorneys

May 15, 1962  R. L. SPEAKER  3,034,665
CONVEYOR SYSTEM

Filed May 22, 1958  3 Sheets-Sheet 3

INVENTOR.
RICHARD L. SPEAKER
BY
Andrus + Starke
Attorneys

United States Patent Office 3,034,665
Patented May 15, 1962

3,034,665
CONVEYOR SYSTEM
Richard L. Speaker, Milwaukee, Wis., assignor to Speaker Sortation Systems, Inc., Butler, Wis., a corporation of Wisconsin
Filed May 22, 1958, Ser. No. 737,157
11 Claims. (Cl. 214—11)

This invention relates to a conveyor system and particularly to a conveyor system adapted to automatically transport and distribute a series of loads from one or more sources to predetermined receiving stations.

The sorting and distribution of items for subsequent processing in large establishments is relatively expensive and time consuming. Thus, in merchandise warehouses operated on the bulk pickup principle, a plurality of different items taken from stock must be sorted and assembled into orders before delivery to a central packaging department. Similarly, in the various central Government post offices, the mail is separated according to States and cities or the like for subsequent delivery thereto. Further, many shipping departments of mass production industries require automatic sorting and distributing units.

Presently, such sorting and distribution is under separate manual control of individual operators. Although automatic conveying devices may be employed between the various operators, the removal and actual sorting is done manually by human operators. Consequently, the distribution and sorting is relatively expensive and of course is only as reliable and accurate as the personnel employed.

A satisfactory mechanical sorting and distributing mechanism or system must be relatively rapid and reliable. Further, with the great quantities of material which must be sorted in large merchandizing houses and in other establishments such as the post office, the sorting mechanism must have a relatively large capacity. The mechanism must also operate without damaging the merchandise being processed.

In accordance with the present invention a conveyor unit comprises a plurality of separately operable transporting platforms which are series connected to successively carry matter to be sorted from a central loading station to various preselected receiving stations. The platforms are individually pivotally supported and are adapted to be tilted laterally of the direction in which they are traveling in order to laterally discharge the items supported thereon.

As each platform is loaded, a control circuit is established to automatically coordinate the travel of the platform to a preselected receiving station and to actuate a suitable automatic tilting means operating to pivot the platform to a discharge position incident to precise alignment of the platform with the receiving station.

The tilting of the platform is automatically accomplished through the interaction of a movable member mounted adjacent the receiving station and selectively movable into the path of travel of a portion of the platforms. As a platform moves past an actuated movable member, a portion of the platform engages the member and in overriding the same the platform is tilted to discharge the material thereon. A locking mechanism locks or holds the platform in the tilted position until passing all succeeding unloading stations to insure discharge of the material and to simplify the control of the tilting operation.

In accordance with a further aspect of the invention, the platforms are adapted to selectively tilt in opposite lateral directions with respect to the direction of travel. Selector means at each loading station are connected in the control circuit to regulate the tilting of the platforms to discharge to alternative loading or receiving means which are positioned on opposite sides of the platforms. The selector means are automatically actuated incident to predetermined conditions at the receiving means, such as the quantity of material in each of the receiving means.

The present invention provides a rugged and reliable conveying and sorting apparatus having an unusually large capacity and high rate of movement.

The drawings furnished herewith illustrate the best mode presently contemplated for carrying out the invention.

Figures 1, 6, 7:
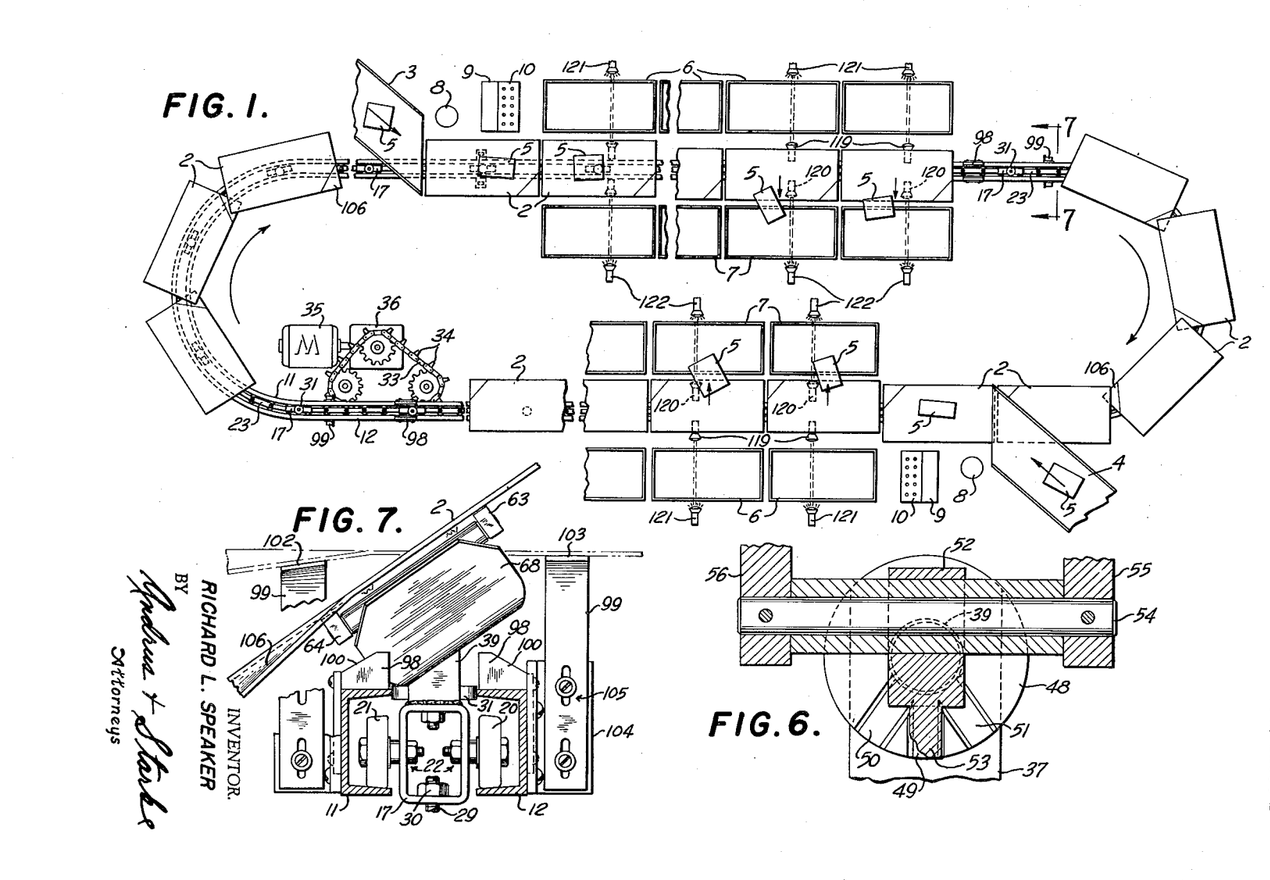
FIGURE 1 is a plan view of a conveyor system employing the present invention.
FIG. 6 is an enlarged fragmentary view taken on line 6—6 of FIG. 5.
FIG. 7 is a view taken on line 7—7 of FIGURE 1 showing a reset mechanism for leveling a tilted platform.

Referring to the drawings and particularly to FIGURE 1 thereof, a loop conveyor track 1 includes long opposite rectilinear sides connected by arcuate end portions.

A continuous series of closely spaced, rectangularly shaped platforms 2 are supported on the track 1 for continuous movement about the track, shown in a clockwise direction for purposes of illustration.

A pair of input chutes 3 and 4 are disposed at opposite ends and sides of the loop track 1, at the leading or entrance position of each rectilinear side of the track 1. The chutes 3 and 4 extend over the platforms 2 which pass thereunder to permit ready depositing of articles 5 upon an aligned platform for transfer along the track 1.

In the illustrated embodiment of the invention, a series of opposed receiving receptacles 6 and 7 are provided along the outer and inner side of the track 1 to selectively receive the articles 5. The receiving receptacles 6 and 7 are removably supported at predetermined unloading stations each of which is located a distance from the respective chutes 3 and 4.

In the present embodiment, the distance between the respective chutes 3 and 4 and the corresponding receptacles 6 and 7 is a whole multiple of the length of a platform 2 and consequently the location of a platform 2 with respect to the input chutes 3 and 4 can be determined by counting the number of subsequent platforms passing the corresponding chute. Further, the manner of spacing allows the simultaneous discharge of the articles 5 from several platforms 2.

As appears hereinafter, each unloading station is provided with a coded indicia which can be translated into a corresponding control signal to selectively actuate the platforms 2 to discharge the articles 5.

The two rectilinear sides of track 1 form a pair of separate and functionally similar conveying and sorting lines, in the illustrated embodiment of the invention. Therefore, only the distributing and sorting line associated with input chute 3 is described hereinafter.

Referring particularly to FIG. 1, each incoming article 5 is manually placed upon a moving platform 2 by an operator located at a loading station 8 adjacent the input chute 3.

A second operator is located at a control unit 9 adjacent the loading station 8 and reads the unloading station code indicia which is carried by each article 5. The code indicia is then inserted by the second operator in the control unit 9 by operation of a control panel 10, which automatically establishes a memory circuit to control the discharge of each particular package 5 at the correct receiving receptacle 7 incident to alignment of the platform and the receptacle.

Figure 2:
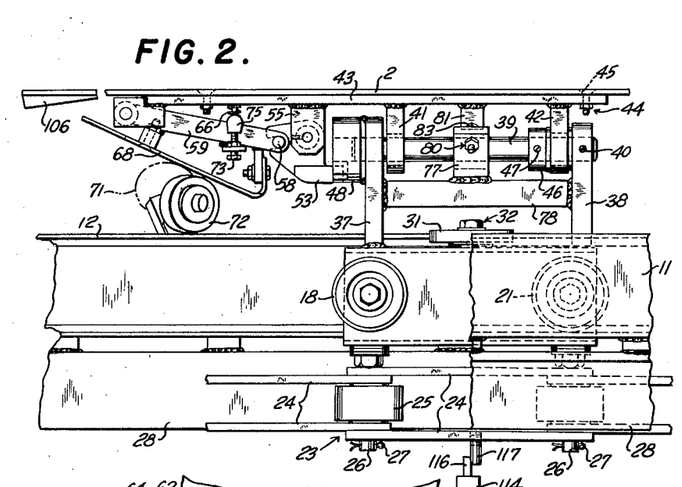
FIG. 2 is a side elevation, with parts broken away, of one of the transporting platform units shown in FIGURE 1.
Figure 3:
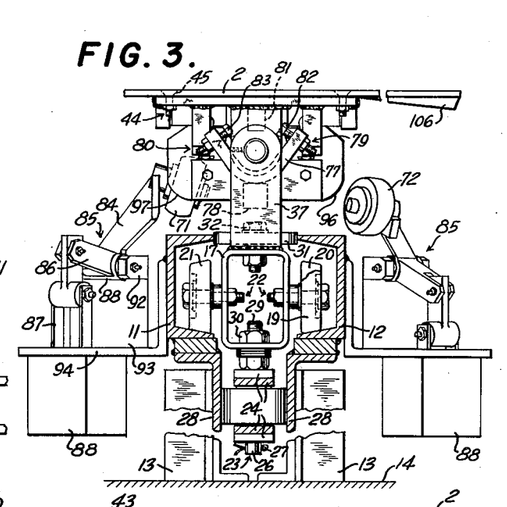
FIG. 3 is a front elevation of a platform unit.

Referring particularly to FIGURES 2 and 3, the supporting and moving assembly for one of the platforms 2 and the adjacent track 1 is shown in detail.

The track 1 comprises a pair of laterally spaced continuous side rails 11 and 12 supported upon a suitable base structure 13 which is adapted to rest upon a supporting floor 14 or the like and raise the track 1 above the level of the receptacles 6 and 7.

Each side rail 11 and 12 is generally a U-shaped channel opening toward the other side rail. The inner surface of the lower side of each of the side rails 11 and 12 constitutes track surfaces 15 and 16 which taper outwardly and downwardly toward each other. A tubular truck 17 having a substantially rectangular cross-section is disposed between the spaced side rails 11 and 12 and includes four suitably spaced supporting wheels 18, 19, 20 and 21 which rest on the track surfaces 15 and 16 to movably support the truck 17. The periphery of wheels 18 through 21 are provided with a taper corresponding to that of the mating track surfaces 15 and 16 to stabilize the truck against lateral movement.

Each of the wheels is mounted to a side of the truck 17 by a similar bearing bolt and nut unit 22 which passes through the side wall of the truck.

The truck 17 is rigidly connected to an endless precision drive chain 23 to support the chain and for simultaneous movement therewith about the track 1. The chain 23 includes a plurality of series connected opposed chain links 24 generally corresponding in length to the length of the individual trucks 17. Rotating members 25 are disposed between the chain links 24 to hold the links in spaced relation and to provide a rotating engaging bearing surface for pulling or driving the chain as subsequently described. The adjacent overlapping chain links 24 are secured together by a connecting shaft 26 which freely passes downwardly through aligned openings in the superimposed ends of the links 24 and rotating member 25, and by a cotter pin 27 secured to the lower end of the shaft 26.

A pair of opposed inverted L-shaped angles 28 are welded or otherwise secured to the side rails 11 and 12 and to the supporting base 13 of the track 1 and are arranged to guide the chain 23 in a path corresponding to the configuration of track 1.

The bottom wall of each truck 17 is provided with a pair of openings spaced in accordance with the openings in each chain link 24 and aligned therewith. Each of the bolts 26 includes a vertical extension 29 which passes through the aligned opening in the truck 17. A hex-nut 30 is threaded onto this vertical extension 29 and rigidly connects the truck 17 and the chain together. Consequently, as the chain 23 moves about the track 1, the truck 17 similarly moves.

A precision chain 23 is employed to maintain constant and accurate spacing of the trucks 17.

A disc-like guide wheel 31 is rotatably mounted on the top wall of the truck 17 by a suitable bolt and nut assembly 32. The wheel 31 is disposed in a horizontal plane corresponding to the plane passing through the upper legs of the side rails 11 and 12. The diameter of the guide wheel 31 corresponds generally to the spacing between the opposed edges of the side rails to prevent substantial lateral movement of the trucks 17.

Referring to FIGURE 1, the precision chain 23 is driven by a caterpillar drive including an endless chain 33 having a plurality of outwardly extending lugs 34 which are adapted to enter between the individual chain links 24 and operatively engage the rotatable members 25 of precision chain 23. A drive motor 35 is connected through a speed reducer 36 to continuously and constantly drive the chain 33 and consequently chain 23.

The motor 35 is preferably a variable speed motor to allow adjustment of the speed in accordance with the weight of the packages being received and the responsiveness of the discharge apparatus for each platform 2, more fully described hereinafter.

Figure 4:
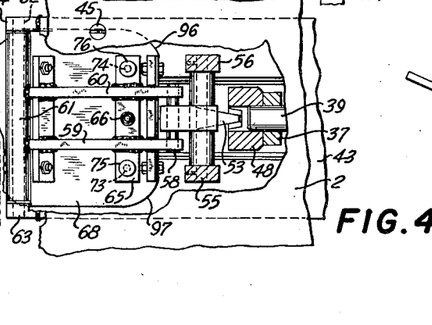
FIG. 4 is a fragmentary plan view, with parts broken away, of FIG. 2.

Referring particularly to FIGURES 2–4, platform 2 is pivotally supported on truck 17 as follows: A pair of upstanding bearing brackets 37 and 38 are welded to opposite ends of each truck 17. A shaft 39 is secured in suitable openings in the upper ends of brackets 37 and 38 as by a setscrew 40 which threads radially through the upper edge of bracket 37 and into engagement with the shaft 39.

A pair of axially spaced bearing members 41 and 42 depend from the undersurface of a carriage plate 43 and are journaled upon the shaft 39 adjacent the upstanding brackets 37 and 38. The bearing members 41 and 42 are freely journaled on the shaft 39 to allow pivoting movement of the carriage plate 43 about the shaft 39.

The platform 2 is rigidly secured to the upper surface of the carriage plate 43 by a plurality of setscrews and nuts 44 having the heads 45 recessed into platform 2 to maintain a continuous and unobstructed surface. A collar 46 is releasably secured to the shaft 39 by a setscrew 47 and disposed in engagement with either of the depending bearing members, shown as bearing member 41, to clamp the bearing member between the collar 46 and the adjacent bracket 37 and prevent sliding of the platform 2 on shaft 39.

Figure 5:
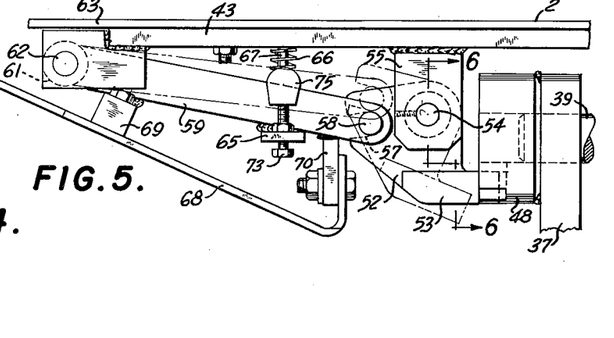
FIG. 5 is an enlarged detail view of the tilting and locking mechanism.

The platform 2 is adapted to be selectively locked in any one of three pivoted positions. Referring particularly to FIGS. 2, 5 and 6, a latch member 48 having three angularly spaced slots 49, 50 and 51 is secured to the forward end of shaft 39 as by press fit or the like. The slot 49 extends in a vertical direction and the slots 50 and 51 are oppositely angularly spaced in accordance with a predetermined final tilt to be imparted to the corresponding platform 2.

A locking member 52 includes a dog 53 which is adapted to be selectively inserted within the slots 49, 50 and 51. The member 52 is pivotally secured upon a shaft 54 which extends laterally and parallel to the platform 2 and which is secured between a pair of laterally spaced brackets 55 and 56 depending downwardly from the carriage plate 43. The locking member 52 is thus supported for pivoting movement with the platform 2 about the shaft 39 and latch member 48.

The dog 53 of member 52 is aligned with the central vertical slot 49 when platform 2 is in a horizontal position to lock the platform in this position. If the platform 2 tilts towards a receiving receptacle 6, the dog 53 is aligned with and inserted into the slot 50 due to the pivoting of the member 52. Similarly, reverse tilting of platform 2 toward the receptacles 7 establishes mating of dog 53 and slot 51 to lock the platform in this position.

The forward or leading portion of the member 52 is provided with a slot 57 adapted to receive a transversely extending positioning pin 58.

The pin 58 joins the trailing ends of a pair of laterally spaced arms 59 and 60 which are joined by a common hub 61 at their opposite ends. The hub 61 is journaled for pivotal movement toward and away from the platform 2 upon a shaft 62 secured within depending brackets 63 and 64.

The depending brackets 63 and 64 are suitably secured in spaced relation to each other on the undersurface of the carriage plate 43 to pivotally support the shaft 62 and locate the pin 58 within slot 57.

A cross bar 65 is rigidly secured to an intermediate portion of the arms 59 and 60 and extends laterally therefrom. A coil spring 66 is disposed between the center of the upper surface of the cross bar 65 and the undersurface of the carriage plate 43 to bias the arms 59 and 60 and the attached pin 58 about the shaft 62 and away from plate 43, in a clockwise direction as viewed in FIG. 2. A guide rod 67 depends from the carriage plate 43 into the coil spring 66 to guide the coil spring and hold the coil spring in position.

The pin 58 is thus biased downwardly and holds the member 52 correspondingly rotated about the shaft 54. In this position, the member 52 moves the integral dog 53 into an aligned slot 49, 50 or 51 to lock the platform 2 in position until a subsequent movement of the arms 59 and 60.

A cam plate 68 is bolted or otherwise rigidly secured to depending brackets 69 and 70 on opposite ends of the arms 59 and 60. The cam plate 68 extends transversely of the arms 59 and 60 and downwardly from the platform 2 in the opposite direction of the movement of the platform. The cam plate 68 is adapted to engage and ride over selectively positioned actuating wheels 71 and 72 at each unloading station.

Referring to FIGS. 2 and 3, the wheels 71 and 72 are mounted to opposite sides of the pivot shaft 39 and moved into an actuating position whenever a platform 2 is to be tilted in a manner more fully described hereinafter. The wheel 71 is shown in an actuating position in phantom in FIG. 2 and in full line in FIG. 3 and wheel 72 is shown in a retracted position in both views. When the plate 68 is approximately half way over the wheel 71, engagement is established therebetween to the left of the shaft 39, as shown in FIG. 3. Referring particularly to FIG. 5, the initial engagement between wheel 71 and the cam plate 68 causes the cam plate and attached arms 59 and 60 to pivot toward the platform 2 about the common shaft 62. The pin 58 moves upwardly therewith and pivots the locking member 52 in a clockwise direction. The dog 53 on member 52 disengages the slot 49 and the platform 2 is free to pivot about the supporting shaft 39.

Adjustable stop bolts 73 and 74 are threaded in the outer portions of the cross bar 65 on the arms 59 and 60 and in a nonactuated position terminate in vertically spaced relation to the carriage plate 43. The upper ends of the stop bolts 73 and 74 are provided with nonmetallic tips 75 and 76, respectively, to establish a quiet tilting operation.

The initial movement of the cam plate 68 and the attached arms 59 and 60, as described above, moves the stop bolts 73 and 74 upwardly into engagement with the carriage plate 43. Subsequent pivotal movement of the cam plate 68 and attached arms 59 and 60, as the cam plate 68 continues to ride up and over the wheel 71, is transmitted directly to the carriage plate 43 and the attached platform 2 to effect the desired tilting of the platform.

When the cam plate 68 disengages the actuating wheel 71, the cam plate 68 and the attached arm 59 and 60 rapidly drop to the initial position with respect to the carriage plate 43 under the action of coil spring 66. The locking member 52 is pivoted thereby in a counterclockwise direction and inserts the dog 53 into the aligned slot 50. The platform 2 is then held in the tilted position.

To prevent excessive pivoting of the platform 2, a U-shaped member 77 is centrally supported on a cross bar 78 extending between the upstanding support brackets 37 and 38 and partially encircles the supporting shaft 39. Adustable stop bolts 79 and 80 thread through the opposite ends of the member 77. The bolts 79 and 80 are locked in position with the upper ends at opposite sides of a depending stop arm 81 which is rigidly secured to the lower surface of carriage 43. The arm 81 is equally spaced from the arms of member 77 with the platform 2 in a horizontal position. The angular spacing between member 77 and stop 81 corresponds to the completed tilt of the platform 2 such that the stop arm 81 engages the bolt 79 or 80 as an incident to complete tilting movement. The bolts 79 and 80 are provided with nonmetallic tips 82 and 83, respectively, to absorb the shock forces and provide quiet operation of the mechanism.

The direction of pivotal movement is determined by which of the actuating wheels 71 or 72 are raised into engagement with the platform 68.

The actuating wheels 71 and 72 are selectively positioned at predetermined times to effect pivoting of the correct platform 2 in accordance with the coded signal established in the control unit 9 by the suitable operation of the control panel 10. The wheels 71 and 72 are similarly supported and positioned on opposite sides of the track 1 by similar means to establish opposite lateral pivoting or tilting of the platform 2 to either of two opposite discharge positions. Consequently, only the support of wheel 71 is described in detail and the corresponding parts of the support for wheel 72 are correspondingly numbered.

Figure 8:
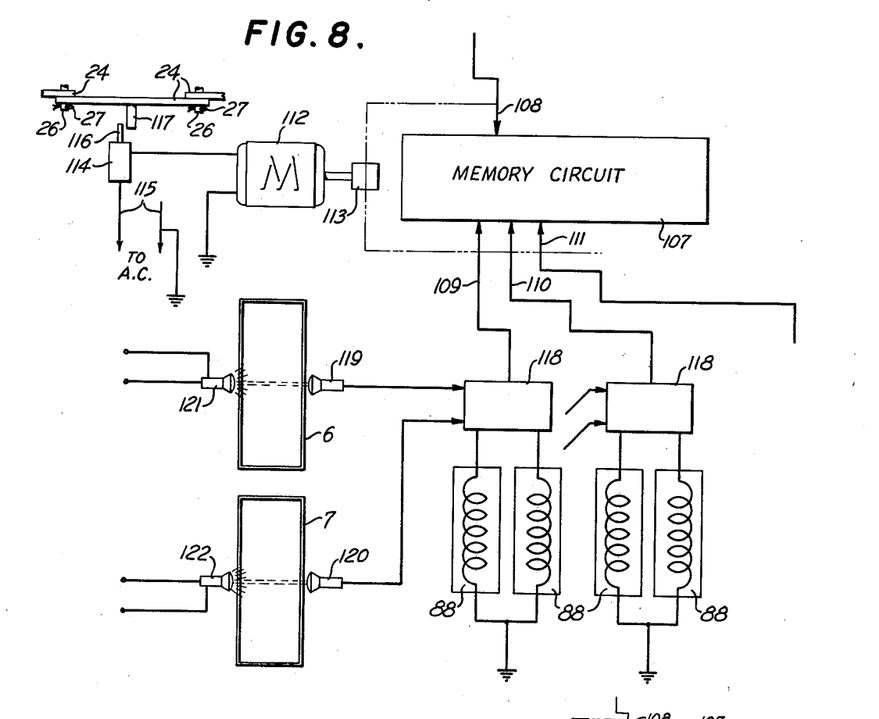
FIG. 8 is a schematic block diagram of an electric control circuit for operating the pivoting mechanism to tilt preselected platforms to a discharge position incident to alignment with a receiving station.

Referring particularly to FIGS. 2–3 and 8, the wheel 71 is rotatably secured to the outer end of one arm 84 of a crank 85 having a second arm 86 which is connected to the armature 87 of a solenoid 88.

The crank 85 includes a bearing hub 89 at the common junction of the crank arms 84 and 86. The hub 89 is journaled on a horizontal shaft 90 which is supported between horizontally extending arms 91 and 92, of a bracket 93.

Bracket 93 is bolted to an angle plate 94 which is welded to the side rail 11. The bracket 93 is suitably positioned and the crank arms 84 and 86 arranged to locate the wheels 71 and 72 in the path of cam plate 68 when solenoid 88 is energized and out of the path of cam plate when solenoid 88 is de-energized, as shown in FIG. 3.

The frame of the solenoid 88 is attached to the underside of an L-shaped plate 94 and the armature 87 extends upwardly through an opening in plate 94 into pivotal connection with arm 86 by a pivotal connector 95. The armature 87 of the solenoid 84 is normally gravity biased downwardly into the solenoid 84. In this position, the associated wheel is moved outwardly of the side rail and downwardly with respect to the cam plate 68.

As shown most clearly in FIG. 3, the lowered wheel 72 is laterally spaced from the outer edge of the cam plate 68 and the latter may therefore move freely past the former. When solenoid 88 is energized the armature 87 moves into the raised position, as shown in FIG. 3 for the wheel 71, and moves the associated wheel 71 upwardly toward the cam plate 68 and inwardly over the side rail and into the path of the cam plate 68. Consequently, when the plate 68 attempts to now move past the particular unloading station, the cam plate 68 engages the wheel 71 and in riding over the wheel causes the platform 2 to tilt, as previously described.

When the platform 2 is tilted to a discharge position, the dog 53 cooperates with either slot 50 or 51, depending upon the direction of tilt, to lock the platform in that position.

The outer edge of cam plate 68 in the tilted position is disposed downwardly toward the adjacent side rail and also slightly laterally of that side rail. Consequently, the crank 85 is formed or so positioned that supported wheels 71 and 72 in a nonactuating position are sufficiently removed from the path of cam plate 68 in both the normally horizontal position and the tilted discharge position of the cam plate 68.

The cam plate 68 extends laterally over the side rails 11 and 12 to establish the simplest and most positive coaction between the cam plate 68 and the wheel 71 or 72. Further, to provide positive tilting of the platform 2 without excessive vertical movement of the wheels 71 and 72, the trailing edge of the cam plate 68 is disposed quite close to the side rails 11 and 12. The outer edges adjacent the trailing edge of the cam plate 68 are curved, as at 96 and 97, to prevent contact with the side rails 11 or 12 when the platform is tilted.

As previously noted, a tilted platform 2 remains tilted for the balance of the movement down the sorting line. A pair of return bumpers 98 and a pair of damping members 99 are secured in longitudinal relation, one of each pair being secured to each side rail 11 and 12 at the end of each sorting line and immediately prior to movement of the platforms 2 into the curved end portions of the track 1.

As shown most clearly in FIG. 7, each of the bumpers 98 consists of a solid member having an upper chamfered surface 100 extending laterally in the same general direction as the incoming tilted cam plate 68.

The bumper 98 is removably secured to a connecting plate 101 which is bolted or otherwise secured to the side rails to rigidly support the bumper resting on the upper surface of the side rail. As a tilted platform 2 moves over the bumper 98, the tilted cam plate 68 associated with platform 2 engages the forward edge of the bumper.

The bumper 98 exerts an upward force on the cam plate 68 and, in a generally similar manner to the operation of the wheels 71 and 72, pivots the platform 2 to a horizontal plane. Thus, referring to FIGS. 2 and 7, the initial engagement of the cam plate 68 with the bumper 98 moves the cam plate 68 and attached arms 59 and 60 toward the carriage plate 43. The pin 58 pivots member 52 about its shaft 54 and removes the locking dog 53 from the aligned angular slot 50.

Continued movement of a platform 2 over a bumper 98 tends to increase the pivotal movement of the cam plate 68 as it rides up and over the bumper 98. The stop bolts 73 and 74, however, engage the underside of carriage plate 43 and pivotal movement is imparted to the platform 2 which then pivots to a horizontal position.

Immediately following the bumper 98, the platform 2 passes over the pair of damping arms 99 which prevent over or excessive vibrating movement of the platform 2. As shown, each of the arms 99 is generally an L-shaped strap member having the upper end thereof curved downwardly to provide opposite curved bearing surfaces 102 and 103 engaging opposite portions of the platform 2. The arms 99 steady the platform 2 and allow the locking member 52 to return the locking dog 53 into engagement with the slot 49 to again positively lock the platform 2 into the horizontal position.

The pair of arms 99 are secured to similar brackets 104 which are bolted to the side of the side rails 11 and 12, respectively, following the bumpers 98. The arms 99 are each adjustably secured to the brackets 104 by a set-screw and slot arrangements 105 to allow accurate positioning of the bumpers.

The platforms 2 are preferably constructed to establish a relatively continuous surface such that the articles 5 can be easily deposited upon a platform 2 without danger of falling between platforms. The articles 5 can then be pushed or slid directly from the input chute 3 directly onto a platform. However, closely spaced platforms 2 in moving about the curved portions of the track 1 move into the plane of the immediately adjacent platform. Although shown substantially flat, the platforms 2 are preferably slightly dished to more positively hold articles 5.

Referring particularly to FIGS. 1, 6 and 7, the leading inner edge or corner 106 of each of the platforms 2 is bent downwardly. This downward portion permits the trailing platform 2 to extend underneath the immediately preceding platform 2 in traveling around the curved portions of the track 1, as shown in FIGURE 1.

The corners 106 may be bent upwardly or entirely removed to accomplish the same result. However, upwardly bent corners may interfere with the discharge of articles 5 and removed corners establish an enlarged break in the transporting surface through which articles 5 may drop.

The curved bearing surface 102 of the corresponding damping arm 99 is positioned downwardly to freely pass the bent corners 106 of platforms 2. Although this establishes a slight space between the principal portion of the platform 2 and the corresponding inner steady arm 99, the distance is relatively slight and the necessary damping of platform vibration during the locking operation is maintained. Consequently, the platforms 2 are returned to a horizontal position before traveling about the end of the track and before they are placed into position adjacent the opposite input chute.

Figure 9:
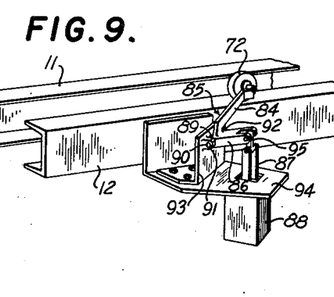
FIG. 9 is an enlarged perspective view of a portion of the pivoting or tilting mechanism.

Automatic controlled tilting of the platforms 2 is established through an electrical control circuit shown in block diagram in FIG. 9. The electrical circuit is adapted to operate a preselected solenoid 88 whenever a selected platform 2 is accurately aligned with a predetermined receiving receptacle 6 and 7 in the following manner:

Referring particularly to FIGURE 9, a memory circuit 107 is provided having an input 108 from the control unit 9 and a plurality of selective outputs 109, 110 and 111. There is a separate output for each unloading station, of which only three outputs are shown for purposes of illustration. Each of the outputs 109, 110 and 111 is connected to a pair of the solenoids 88 associated one with each of the opposed operating discharge wheels 71 and 72 for the several unloading stations.

A step motor 112 is connected through a suitable coupling 113 to the input 108 and to the outputs 109, 110 and 111. A limit switch 114 is connected in power lines 115 to the motor 112. The limit switch 114 is disposed adjacent the loading station or any other suitable location and includes a switch arm 116 extending into a series of projecting arms 117, shown in FIGS. 1 and 9. The arms 117 are threaded into suitably tapped openings in the bottom link 24 of chain 23. One arm 117 is provided for each truck 17 and associated platform 2 and the switch 114 is momentarily closed once each time a platform 2 passes the limit switch 114. Consequently, the motor 112 is intermittently energized to move the respective input and outputs in equal steps.

The input 108 is connected by the stepping motor 112 to successive circuits, not shown, each of which comprises a combination of significant characters which are established in accordance with a predetermined code and subsequently sequentially read by the output devices. The successive circuits provided are at least one more than the number of unloading stations such that a separate output or coded signal is established in the memory circuit for each possible unloading position and a blank circuit is present for the loading station.

For purposes of illustration, each successive circuit comprises nine pairs of control elements, not shown, such as a series connected neon lights and resistance which can be triggered to conduct and remain conducting after the triggering pulse is removed to establish a voltage signal. Each pair represents a different one of the digits 0 through 8.

Each unloading station is coded by a pair of significant digits which is different than any other pair. Thus, assume station one is coded 00, and station two is coded 01 and station three is coded 02 and so on for the various unloading stations. Then by suitable actuation of the control panel 10 of the control unit 9, pairs of corresponding significant digits are successively established through the input 108 in the successive circuits, not shown, in accordance with the unloading station at which the platform 2, is to tilt to discharge an article 5 carried by the corresponding platform.

Previous digits established in the successive circuits may be cancelled in any suitable manner. The memory circuit 107 may include suitable automatic electronic means to cancel previous digits set up in the successive circuits incident to connection thereof with the input 108 and prior to new input digits.

Each output 109, 110 and 111 is electrically connected to successive circuits of the memory circuit to read or scan a single predetermined combination of significant characters different from each of the other outputs. The solenoids 88 for operating wheels 71 and 72 are selectively energized whenever the predetermined significant characters have been established in the circuits scanned.

The outputs 109, 110 and 111 are connected to scan the successive circuits in spaced relation with the input 108 in accordance with the number of platforms 2 existing between the loading station and the corresponding unloading station.

If the output 109 is connected to operate solenoids 88 adjacent the first unloading station following the input chute 3, the stepping motor 112 moves output 109 to the successive circuits of the memory circuit one step after the input to the successive circuits.

Similarly if the output 110 is connected to operate solenoids 88 adjacent the second unloading station following the input chute 3, the stepping motor 112 moves output 110 to the successive circuits of the memory circuit in question two steps after the input 108 to the successive circuits.

The other outputs are similarly connected to the several unloading stations and stepped by motor 112 accordingly. Consequently, the output devices are connected to the successive memory circuits in synchronism with the conveyor movement and a predetermined time after the memory circuit has been established. Consequently, the operation of the respective solenoids 88 adjacent each unloading station is automatically interlocked to the movement of the platforms and are energized to discharge the packages 5 on the platforms 2 at the correct unloading station.

In the illustrated embodiment of the invention, the direction the platforms 2 tilt is individually controlled through a suitable electronic or electrical discriminators 118 which is connected between each of the outputs 109, 110 and 111 and the corresponding paralleled solenoids 88. The discriminators 118 are each also connected to the output of a pair of phototubes 119 and 120 which selectively determine which of the pair of solenoids 88 is energized. The phototubes 119 and 120 are positioned adjacent the receiving receptacles 6 and 7, respectively, at a corresponding unloading station as shown in FIGURE 1. Corresponding lamps 121 and 122 are positioned to direct light across the receptacles 6 and 7 and onto the phototubes 119 and 120. When either of the receptacles 6 or 7 is filled, the illumination and output of the corresponding phototube is reduced. The discriminator 118 is automatically actuated thereby to reverse the connection from the memory output from the one solenoid to the other of the pair of solenoids 88. Consequently, the packages 5 being delivered to the unloading station are automatically diverted from a filled receptacle to an opposite empty receptacle. The receptacles are emptied or replaced at a convenient time during which time the other receptacle is being filled.

In certain applications where space is at a minimum and a predetermined number of different unloading stations are required, the control system may be established to allow the operator to selectively control the direction of tilt in place of the automatic receptacle responsive control previously described.

Figure 10:
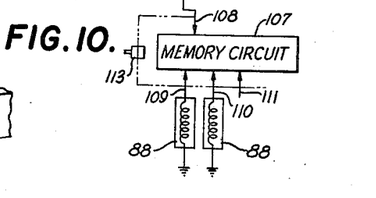
FIG. 10 is a schematic block diagram of an alternative control circuit.

Referring particularly to FIG. 10 of the drawings, a modified control circuit is diagrammatically shown to establish such a control. The illustrated modified control circuit is basically the same as that of FIG. 8, and corresponding elements carry corresponding numbers in the drawing and description.

Referring to FIG. 10, the operator operates the control panel 10 in the same manner as previously described to establish the signal to input 108, as previously described. Outputs 109, 110 and 111 and others, not shown, are coded to one individual receptacle 6 or 7 and are connected directly to a single corresponding solenoid rather than to a pair of solenoids 88 as in FIG. 8. Consequently, each unloading station has a pair of outputs individually connected to tilt the platform in opposite direction from each other. The pairs of outputs are connected in the memory circuit 107 to simultaneously scan a corresponding one of the successive circuits in accordance with the code of the corresponding receiving receptacles 6 and 7.

The control of FIG. 10 establishes an equal number of unloading stations in one half the distance of the control of FIG. 8. However, the time for emptying a receptacle, when employed, is not available.

To insure a correct input to each memory circuit and correct discharge, suitable phototubes or other timing means may be provided interlocked with the movement of platforms 2 to automatically condition the input circuit only during a period a platform 2 is aligned with the loading station and also to condition the output circuits to the solenoids 88 only when a precise alignment between a platform 2 and an unloading station is established.

The input capacity of the apparatus is readily increased by providing two or more control panels having separate operators. The platforms would be assigned to each operator in any suitable manner such as by color coding of the platforms.

Two or more separate control units may also be employed to verify a correct input to the memory system. The operators of the individual units both insert the same unloading code for each successive platform. A comparison circuit, not shown, connects either the input signals to the memory circuit or the output signals from the memory circuit and responds to a difference to establish a delivery or discharge at an error station.

Further, the memory system may be suitably arranged to establish an output unloading signal only if characteristics corresponding to an unloading station has been established. Any other characteristics deliver or discharge the material to an error station for redistribution of the material.

Further, various automatic checks may be provided to insure that the apparatus does not malfunction.

The illustrated box-like receptacles 6 and 7 may be replaced with any other suitable transporting means, such as conveyors, chutes or the like.

The loading of the platforms 2 may be done automatically, if desired.

Further, an operating discharge control can be readily employed to allow nonuniform spacing of the unloading stations independently of the centers between the platforms and dimensionally unrelated receiving means and platforms.

A single discriminating means may be provided to simultaneously reverse the direction of tilt of all platforms rather than the individual reversal of the illustrated embodiment of the invention.

The present invention provides a very simple and reliable rapidly operating conveyor system to distribute and sort various products from a central station.

Various modes of carrying out the invention are contemplated as being within the scope of the following claims particularly pointing out and distinctly claiming the subject matter which is regarded as the invention.

I claim:

1. In a conveyor system including a train of individually pivotally supported platforms adapted to be pivoted laterally in either direction to selectively discharge material to either of two receiving means oppositely located at each unloading station, control means adapted to selectively tilt said platform in opposite directions incident to registry with a predetermined unloading station, and means for each unloading station interconnected to said control means and coupled to the receiving means responsive to a predetermined condition of the material received at the two receiving means at the preselected unloading station to automatically determine the direction the platform tilts in accordance with the condition of the two receiving means.

2. In a conveyor system including a train of individually pivotally supported platforms adapted to be pivoted laterally in either direction to discharge material selectively to either one of two receiving means oppositely located at each unloading station, control means adapted to pivot said platform incident to registry with a preselected unloading station, selector means to establish the initial direction of tilt of said platforms into one of said two receiving means, and means responsive to a predetermined receipt of material at the first receiving means to establish a reverse tilting of said platforms.

3. In combination in a conveyor system, a series of truck units adapted to be successively advanced in timed relation from a loading station to a plurality of unloading stations, each of said truck units comprising, a main body, a pivot shaft on said body extending in the direction of travel, a platform pivotally supported by said shaft, a cooperating dog and slotted member secured to said platform and said body to lock said platform in alternate positions one of which is a transporting position and the other of which is an article discharge position, actuating means associated with said dog and slotted member to first disengage the same to release said platform and to subsequently tilt the platform to an alternate position, controlled means at each of said unloading stations adapted to selectively engage said actuating means and normally biased to a non-engaging position, and control means adapted to selectively actuate said movable means incident to registry of a preselected platform and unloading station.

4. In a conveyor system having a series of continuously moving platforms individually pivotally supported for tilting to a discharge position for transferring matter from a source to a plurality of unloading stations, means adjacent each unloading station adapted to be operatively coupled to a platform aligned with said unloading station to tilt the platform to a discharge position, a control unit including a memory having an input and an output means, means to translate said input to an output in timed relation to the movement of said platforms, means under the conjoint control of said platforms and said input means to control completion of the memory circuit, output circuit means connecting the output of said memory circuit to said actuating means, and separate interlocking means under the control of said unloading stations and responsive to the material received at the unloading stations to control the operative completion of said output circuit.

5. In a conveyor system, a pair of spaced and aligned rail members forming a pair of spaced tracks extending along a series of unloading stations, two actuators located at each unloading station and mounted to opposite sides of the rail members and adapted to selectively be positioned over the adjacent rail member and to be retracted downwardly and laterally therefrom, a train of truck members movably mounted on said spaced tracks and between said rail members for successive movement past said unloading stations, a plurality of platforms pivotally supported one on each of said truck members and having a horizontal transporting position and tilting laterally of said rail members to a discharge position, cam plates pivotally secured one to the underside of the leading portion of each platform and extending rearwardly and downwardly therefrom, said cam plates extending laterally over said rail members and into the path of an actuator positioned over a rail member to establish engagement therebetween, said actuators in a retracted position being disposed in spaced relation to tilted cam plates, a locking means including cooperating locking members having releasably interlocking openings and projections, one of said locking members being rigidly mounted upon said truck member and the other of said locking members being secured to said platform for pivotal movement perpendicularly to said cam plate pivotal movement, means on said cam plate pivotally interconnected with the pivotal locking member to transmit pivotal movement of the cam plate to the locking member, biasing means biasing said cam plate angularly removed from said platform, stop means on said cam plate adapted to engage said platform after predetermined releasing movement of said cam plate whereby in passing over an actuator positioned over a rail member the cam plate pivots toward the platform to release said locking member and then tilts said cam plate and platform as a unit, said biasing means returning said cam plate to a normal position after passage over an actuator and thereby interlocking said lock members to hold said platform in the tilted positions, and a member mounted on said rail members following the last unloading station and extending into the path of any tilted cam plate and terminating in spaced relation to an untilted cam plate, said member serving to pivot said platform to the normal horizontal position.

6. In a conveyor system, an annular track having rectilinear side portions, a series of unloading stations adjacent each rectilinear side portion, a train of truck members movably mounted on said track for successive movement past said unloading stations, a horizontal transporting platform pivotally supported one on top of each of said truck members and in spaced relation to said truck members for lateral tilting to a discharge position, cam plates pivotally secured one to the underside of the leading portion of each platform and extending rearwardly and downwardly therefrom, two actuators mounted one each on opposite sides of the track at each unloading station and adapted to be selectively positioned above the track to opposite sides of the pivotal support of said platforms and to be retracted downwardly and laterally therefrom, said cam plates extending laterally over said track and intersecting the location of an actuator positioned above the track to establish engagement therebetween, said actuators in a retracted position being disposed in spaced relation to the tilted platforms and cam plates, two locking members having cooperating slots angularly positioned in accordance with the transporting position and the discharge positions of said platform and a dog adapted to be selectively engaged with said slots, one of said locking members being rigidly mounted upon said truck member and the other of said locking members being pivotally secured to said platform for pivotal movement perpendicularly to the pivotal movement of said cam plate, a pin secured to said cam plate and pivotally connected to the pivotal locking member to transmit pivotal movement of the cam plate to the pivotal locking member, biasing means biasing said cam plate angularly removed from said platform, stop means on said cam plate extending toward the platform and adapted to engage said platform after predetermined releasing movement of said cam plate whereby in passing over an actuator positioned over the track the cam plate pivots toward the platform to release said locking members and then tilts said cam plate and platform as a unit, stop means on said truck member to prevent excessive tilting of a platform, said biasing means returning said cam plate to a normal position and interlocking said lock members to hold said platform in the tilted positions, and bumper members mounted on said track following the last unloading station at each rectilinear side portion of the track, said bumper members extending into the path of tilted cam plates and terminating in spaced relation to untilted cam plates and thereby serving to pivot said platform to the normal horizontal position, and damping members following said bumper members to engage the undersurface of the platforms and prevent excessive movement of the platform.

7. A truck assembly adapted to constitute one of a series of similar assemblies moving from loading means to a plurality of series arranged unloading stations having actuating members selectively positioned in alternate positions for distributing material to the unloading stations, which comprises a body portion, a shaft mounted on said body portion for simultaneous movement therewith, a platform mounted on said shaft for pivotal movement about said shaft, a locking member having three angularly positioned openings and secured to one end of said shaft, a cooperating locking member pivotally secured to the platform for simultaneous pivoting about said shaft and having a dog adapted to be selectively disposed within said openings to support said platform in a transporting position or in a discharge position, an angularly position cam surface positioned to intersect with and ride over said actuating members to tilt the platform, said cam surface being pivotally mounted for limited movement independently of said platform, and means connected to said cam surface and to said cooperating locking member to disengage said dog from an engaged opening to release said platform for pivotal movement incident to said limited cam surface movement.

8. In a conveyor system for transporting a load to an unloading station, a load supporting structure, a transport means for said structure, a centrally located pivot mounting secured to the structure and to the transport means to provide a substantially balanced mounting of the load supporting structure and permit tilting of the load supporting structure to either side, interengaging mechanical latch members secured one to the structure and one to the transport means to hold the structure in a horizontal load carrying position, said latch members being mounted for limited relative movement to release the supporting structure for tilting movement to either side thereof, and tilting means at the unloading stations selectively actuable to engage the one of said latch members and said load supporting structure and to sequentially disengage said latch member and then transmit a pivot forced from the tilt means to the structure to pivot the structure about the pivotal mounting selectively to either side.

9. The structure of claim 8 wherein said mechanical latch members include a first latch member pivotally secured to the load supporting structure for limited movement relative thereto in the direction of travel of the supporting structure for engagement and disengagement of a second latch member fixedly secured on the movable carrier to releasably hold the structure in a load carrying position, and said means at the unloading stations including separate means disposed on opposite sides of the moving carrier and selectively engageable with opposite sides of the latch member on the supporting structure to sequentially disengage the first latch member from the second latch member and tilt the structure about the pivotal mounting selectively on load discharging positions to opposite sides of the carrier.

10. The conveyor system of claim 9 wherein the means for sequentially releasing the locking means and tilting the structure includes a first tilt member connected to the first latch member and second tilt members connected one each at the unloading stations, said second tilt members being positioned in alternate positions one of which aligns the second tilt member in the path of the first tilt member and a second of which places the second tilt member from the path of the first tilt member, and one of said tilt members constituting an inclined ramp over which the other tilt member rides in the aligned position with the initial movement upon the inclined ramp moving the first tilt member to release the locking means and the subsequent movement substantially completely pivoting the load supporting structure to the discharge position.

11. The conveyor system of claim 8 wherein said interengaging mechanical latch members include a disengageable pin and slot provided one on the structure and one on the movable carrier for holding the structure in a horizontal load carrying position, and said means at the unloading stations selectively engaging the supporting structure and sequentially disengaging the pin from the slot and pivoting the structure about the pivotal mounting to a load discharging position.

References Cited in the file of this patent

UNITED STATES PATENTS

| | | |
|---|---|---|
| 1,871,054 | Hartley | Aug. 9, 1932 |
| 1,911,525 | Neuman | May 30, 1933 |
| 2,193,076 | Preble | Mar. 12, 1940 |
| 2,227,778 | Fischbach | Jan. 7, 1941 |
| 2,344,596 | Carmina | Mar. 21, 1944 |
| 2,431,174 | Henry | Nov. 18, 1947 |
| 2,497,874 | Evans | Feb. 21, 1950 |
| 2,667,260 | Pyles | Jan. 26, 1954 |
| 2,717,086 | Bush | Sept. 6, 1955 |
| 2,737,288 | Boots | Mar. 6, 1956 |
| 2,833,427 | James | May 6, 1958 |
| 2,848,102 | Whitney | Aug. 19, 1958 |

FOREIGN PATENTS

| | | |
|---|---|---|
| 51,408 | Sweden | Apr. 22, 1922 |

UNITED STATES PATENT OFFICE
CERTIFICATE OF CORRECTION

Patent No. 3,034,665                                                                         May 15, 1962

Richard L. Speaker

It is hereby certified that error appears in the above numbered patent requiring correction and that the said Letters Patent should read as corrected below.

Column 14, line 3, for "on" read -- to --; line 4, for "to" read -- on --.

Signed and sealed this 13th day of November 1962.

(SEAL)
Attest:

ERNEST W. SWIDER                                               DAVID L. LADD
Attesting Officer                                              Commissioner of Patents